US 6,560,239 B1

(12) United States Patent
Frid et al.

(10) Patent No.: US 6,560,239 B1
(45) Date of Patent: May 6, 2003

(54) RETAINING A DATA COMMUNICATION WHILE RESPONDING TO A PAGING NOTIFICATION

(75) Inventors: Lars Anders Frid, Stockholm (SE);
Göran Leif Andersson, Järfälla (SE);
Ulf Ingemar Olsson, Sollentuna (SE);
Chris Kannas, Vårgårda (SE); Martin Bäckström, Huddinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/111,175

(22) Filed: Jul. 8, 1998

(51) Int. Cl.[7] .............................................. H04L 12/56

(52) U.S. Cl. ...................................... 370/426; 370/216
(58) Field of Search ................................ 370/426, 341,
370/338, 352, 252, 280, 294, 389, 216,
254, 228, 229; 455/557, 63, 68, 426, 422,
435, 437; 379/59, 93, 215, 215.01; 714/751;
375/240.12; 709/201, 200, 203, 248, 227,
228; 345/98

(56) References Cited

U.S. PATENT DOCUMENTS

| | | | | |
|---|---|---|---|---|
| 4,291,200 A | * | 9/1981 | Smith | 379/93.14 |
| 4,654,867 A | * | 3/1987 | Labedz et al. | 379/59 |
| 4,995,074 A | | 2/1991 | Goldman et al. | 379/97 |
| 5,473,675 A | | 12/1995 | Chapman et al. | 379/93 |
| 5,479,480 A | | 12/1995 | Scott | 379/59 |
| 5,550,908 A | * | 8/1996 | Cai et al. | 379/215 |
| 5,701,297 A | * | 12/1997 | Csapo et al. | 370/341 |
| 5,711,012 A | * | 1/1998 | Bottoms et al. | 455/557 |
| 5,887,255 A | * | 3/1999 | Jackson et al. | 455/426 |
| 5,982,774 A | * | 11/1999 | Foladare et al. | 370/401 |
| 6,125,177 A | * | 9/2000 | Whitaker | 379/243 |
| 6,131,121 A | * | 10/2000 | Mattaway et al. | 709/227 |
| 6,161,013 A | * | 12/2000 | Anderson et al. | 455/435 |
| 6,188,886 B1 | * | 2/2001 | Macaulay et al. | 379/245 |
| 6,317,488 B1 | * | 11/2001 | Depond et al. | 379/215.01 |
| 6,353,611 B1 | * | 3/2002 | Norris et al. | 370/356 |

FOREIGN PATENT DOCUMENTS

| | | | | |
|---|---|---|---|---|
| WO | WO 97 35450 | | 9/1997 | |
| WO | WO-97/35450 | * | 9/1997 | H04Q/7/22 |

OTHER PUBLICATIONS

Standard Search Report for RS 101338 US completed on Mar. 19, 1999, EPO.
U.S. patent application Ser. No. 09/112,083, Jul. 8, 1998, Bo Lindfors.
"Semi Connected Mode for PPP Links" by Mikael Latvala (Oy LM Ericsson Ab) and George Liu (Ericsson Radio Systems), Point–to–Point Protocol Extension Group, Mar. 13, 1997, pp. i–ii and 1–15.

* cited by examiner

Primary Examiner—Dang Ton
(74) Attorney, Agent, or Firm—Jenkens & Gilchrist

(57) ABSTRACT

A method and system enables a packet-switched data communication in a wireless communications system to be quickly and easily reestablished after interruption. The computer communications protocol that has been negotiated during the establishment of the packet-switched data communication may be saved upon interruption and later restored. In an exemplary embodiment, a wireless subscriber activates a call-waiting-type service along with an option to retain a packet-switched data communication. Thereafter, the subscriber may be engaged in a data communication on a packet data channel of the wireless communications system. Acceptance of a subsequent incoming, circuit-switched voice call causes the data packet session to be suspended, but the negotiated parameters of the computer communications protocol are saved. After the subscriber terminates the voice call, another data packet session is established with the saved parameters without needing to renegotiate the computer communications protocol parameters. Packet data applications that have not timed-out may resume execution without reinitialization.

24 Claims, 3 Drawing Sheets

RETAINING A DATA COMMUNICATION WHILE RESPONDING TO A PAGING NOTIFICATION

BACKGROUND OF THE INVENTION

1. Technical Field of the Invention

The present invention relates in general to the telecommunications field, and in particular, to a method and system for retaining and quickly restoring interrupted data communications in wireless communications systems.

2. Description of Related Art

Mobile wireless communication is becoming increasingly important for safety, convenience, and efficiency. One prominent mobile communication option is cellular communication. Cellular phones, for instance, can be found in cars, briefcases, purses, and even pockets. These cellular phones are capable of providing both circuit-switched voice connections and packet-switched data connections.

The circuit-switched voice connections are typically used to provide voice communication from a wireless subscriber to either another wireless subscriber over the associated wireless network system (e.g., a Public Land Mobile Network (PLMN)) or either a landline or an Integrated Services Digital Network (ISDN) subscriber over the Public Switched Telephone Network (PSTN). The packet-switched data connections may be used to transmit information packets directly to the wireless network system to which the cellular phone is currently in communication. The packet-switched data connections may alternatively be used as a conduit for forwarding information data packets from the wireless network system to a public network such as the Internet or to a private network such as a corporate local area network (LAN).

While both cellular communication and data packet transmission have been proliferating individually, the two technologies have been converging as well. For example, many subscribers to wireless networks now access the Internet or otherwise engage in data packet exchanges via their cellular phones or other wireless terminals. Wireless subscribers are thus able to send/receive data packets towards/from, for example, another PLMN or PSTN subscriber as well as engage in voice conversations over a PLMN or PSTN.

Subscribers to wireless network systems may additionally use their cellular phones to activate various services available from their cellular provider through the cellular communications system. Examples of such services are voice mail, call forwarding, and call waiting. In general, the call waiting service provides notification to a subscriber who is engaged in a first call that a second incoming voice call is being received by the cellular network. The subscriber may then choose to either ignore the notification or receive the second incoming voice call.

In some recently-developed wireless network systems, during packet-switched data connections, voice paging is permitted so that a subscriber may be notified when an incoming voice call is detected. In other words, a call-waiting-type feature can optionally be configured to interrupt packet-switched data connections in the event of an incoming circuit-switched voice call. Unfortunately, even in these few relatively modern cellular systems, interruption of the packet-switched data connection by an incoming circuit-switched voice call completely terminates the packet-switched data connection, including any negotiated computer communications protocol. Maintaining both the packet-switched data connection and the circuit-switched voice call at the same time requires a complicated and costly cellular phone that can operate (e.g., transmit/receive) on two channels (and probably two separate frequencies) simultaneously. As a result, when using standard cellular phones in conventional wireless networks, a subscriber must reacquire a packet-switched data channel and renegotiate a computer communications protocol in order to reestablish the interrupted data connection after completion of the interrupting voice call. There is a need, therefore, to be able to accommodate incoming voice calls during packet-switched data connections without relying on a complicated and costly cellular phone.

Renegotiation of the computer communications protocol governing the data communication can be time consuming. Furthermore, any currently executing packet applications are discontinued upon interruption and must therefore be reinitialized after reestablishing a packet-switched data connection. Moreover, the subscriber may experience difficulty renegotiating the computer communications protocol, thus leading to an extraordinary delay or even an inability to reestablish a packet-switched data communication.

In summary, conventional procedures in wireless communications systems do not enable a packet data communication to be quickly or easily reestablished after an interruption by, e.g., the acceptance of an incoming circuit-switched voice connection in response to a call-waiting-type of notification for the incoming circuit-switched voice connection.

SUMMARY OF THE INVENTION

The present invention provides a method and system for implementing a call-waiting-type service in which packet data communications may be retained upon interruption and quickly restored thereafter. The packet data communication retention call-waiting feature may be activated by the subscriber on either a permanent or a per-call basis. A retention activation request is preferably transmitted by a requesting mobile station (MS) as a packet data connection is initially being established.

The requesting MS first attempts to initiate a packet data uplink to a wireless network currently associated with the MS. Once acquired, a data terminal equipment (DTE) associated with the MS and the relevant wireless network negotiate a computer communications protocol such as a Point-to-Point Protocol (PPP). The mutually-understood computer communications protocol determines the framing and other parameters under which information is to be transmitted across a link from the subscriber's DTE to a given point within the wireless network. For example, a dynamic data communication number (DCN) may be assigned to the DTE/MS when establishing a packet data communication. The PPP negotiation alone includes five phases, including the establish, authenticate, and network phases. Various encapsulation format options, for example, are determined for the PPP; information throughput is eventually possible in the network phase. Once the PPP link is negotiated, the DTE/MS may initiate user packet data transfer to/from the network.

When an incoming voice call notification message is received at the MS, the subscriber may decide to accept the incoming voice call. If accepted, then the packet data session is suspended by storing the negotiated parameters of the PPP (or other protocol) link. The negotiated parameters may be saved in memory at the DTE and in the wireless network. The MS, after accepting the incoming voice call, eventually terminates the voice call.

The voice call completion notification message triggers a reestablishment of the suspended packet data session using the retained information. The stored negotiated parameters are reactivated, and the link is restored without needing to renegotiate the PPP link. Additionally, any packet data applications that have not timed-out may be continued without reinitializing them.

An important technical advantage of the present invention is that subscribers are provided another option for a call-waiting-type service.

Another important technical advantage of the present invention is that a subscriber may establish a packet-switched data connection with an option to retain part of the packet-switched data connection upon experiencing an interruption.

Yet another important technical advantage of the present invention is that computer communications protocol parameters of a packet data communication can be saved when an MS/DTE of a subscriber receives, via the packet-switched data connection, a paging notification message for a circuit-switched voice call.

Yet another important technical advantage of the present invention is that the saved parameters of the packet data communication can be quickly and easily restored after discontinuing the circuit-switched voice call.

The above-described and other features of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

BRIEF DESCRIPTION OF THE DRAWINGS

A more complete understanding of the method and system of the present invention may be had by reference to the following detailed description when taken in conjunction with the accompanying drawings wherein.

DETAILED DESCRIPTION OF THE DRAWINGS

A preferred embodiment of the present invention and its advantages are best understood by referring to FIGS. 1–4 of the drawings, like numerals being used for like and corresponding parts of the various drawings.

Aspects of the air interface for the Personal Digital Cellular System (PDC) of Japan (RCR STD-27F) (formerly called the Japanese Digital Cellular System (JDC)) will be used to describe a preferred embodiment of the present invention. However, it should be understood that the principles of the present invention are applicable to other wireless communication standards (or systems), especially those in which a mobile station may be notified of the existence of an incoming call during a preexisting packet-switched data connection.

Figure 1:
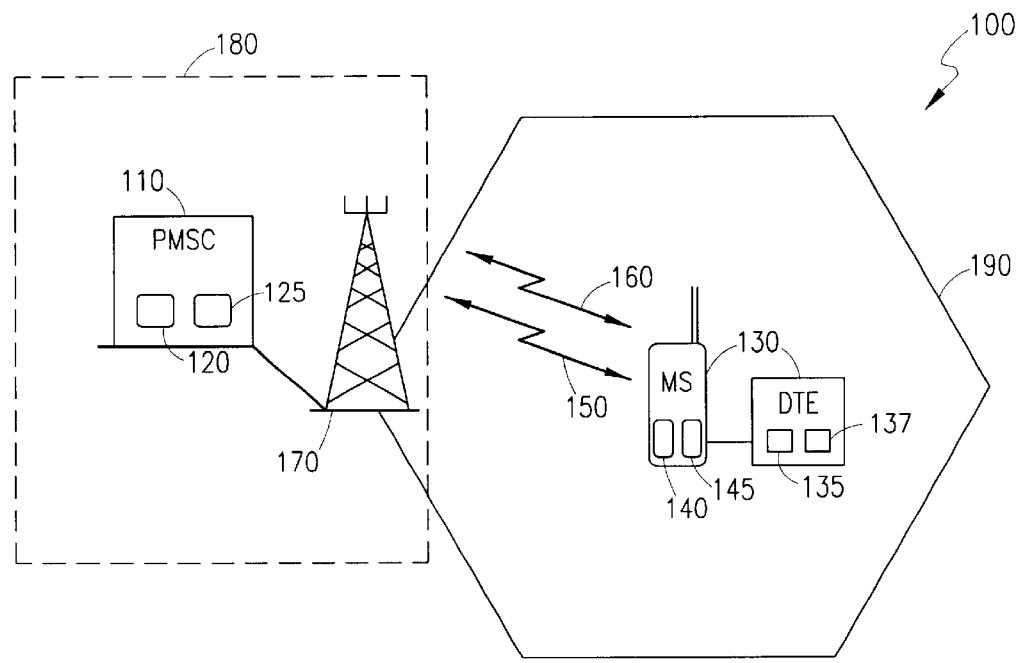
FIG. 1 illustrates a wireless communications system and mobile station/data terminal equipment in which the present invention may be advantageously implemented.

Referring now to FIG. 1, a wireless communications system and mobile station/data terminal equipment in which the present invention may be advantageously implemented is illustrated. A wireless communications network system 180 and an MS/DTE 130 in radio communication therewith are illustrated generally at area 100. The MS/DTE 130 is located in a cell 190, which includes a base station (BS) 170. As part of the wireless system 180 and connected to BS 170, a Packet Mobile Services Switching Center (PMSC) 110 is shown to include a PMSC memory 120 and a PMSC processing unit 125. Other aspects of the wireless network 180 have been omitted so as not to obscure the present invention. Also, the MS/DTE 130 is shown to include an MS memory 140, an MS processing unit 145, a DTE memory 135, and a DTE processing unit 137.

The MS and the DTE are shown connected by an information link and are jointly designated by the numeral 130. It should be noted that although the MS portion of the MS/DTE 130 is represented as a hand-held mobile phone, the MS portion of the MS/DTE 130 may alternatively be any wireless terminal such as a vehicle-mounted cellular phone. Additionally, although the MS and DTE portions of the MS/DTE 130 are shown as discrete units, the portions may be integral, the MS memory 140 and the DTE memory 135 may be a single memory, and the MS processing unit 145 and the DTE processing unit 137 may be a single processing unit. In fact, the MS/DTE 130 will be jointly referred to as a mobile terminal, which includes any electronic computing element with wireless capabilities. It should also be understood that the wireless network 180 actually extends beyond the dashed lines (e.g., to include the cell 190), but it is not intended to include the MS/DTE 130.

The MS/DTE 130 is in wireless communication with the PMSC 110 of the wireless network 180 via the BS 170. The PMSC memory 120, the MS memory 140, and the DTE memory 135 are configured so as to be able to store information necessary for the PMSC 110 and the MS/DTE 130 to execute their respective functions within the area 100. Likewise, the PMSC processing unit 125, the MS processing unit 145, and the DTE processing unit 137 are configured so as to be able to implement their respective functions for the PMSC 110 and the MS/DTE 130 in the area 100. The PMSC memory 120 and the PMSC processing unit 125, together and in conjunction with executable code (e.g., from software, hardware, or firmware), form circuitry to accomplish both the standard tasks of the PMSC and those of the present invention. Correspondingly, the MS memory 140, the DTE memory 135, the MS processing unit 145, and the DTE processing unit 137, together and in conjunction with executable code (e.g., from software, hardware, or firmware), form circuitry to accomplish both the standard tasks of the MS/DTE 130 and those of the present invention.

Packet-switched data connection 150 and circuit-switched connection 160 are also illustrated as possible implementations of the wireless transmissions between the BS 170 and the MS/DTE 130. The circuit-switched connection 160 may, for example, transmit/receive either voice or fax data. The packet-switched data connection 150 typically transmits/receives data information due to the discrete nature of packet connections. However, packet-switched data connection 150 may be used to transmit/receive, for example, voice as well (e.g., voice over Transmission Control Protocol/Internet Protocol (TCP/IP)).

When an MS/DTE 130 elects to exchange information according to a computer communications protocol (e.g., because an application selected by the subscriber uses PPP), the MS/DTE 130 first establishes a connection with the wireless network. The MS/DTE 130 first "acquires" a channel according to the Link Access Procedures for Digital Mobile channels (LAPDm). The MS/DTE 130 waits until an idle indication is detected for a particular channel. The MS/DTE 130 then transmits a first frame of a (possibly) multi-frame set of information. Subsequently, the MS/DTE 130 will try to confirm that it has "acquired" the particular channel by receiving, processing, and then comparing a downlinked partial echo (PE) to a PE that it has calculated. If the PEs match, then the MS/DTE 130 may transmit the remaining frames of its multi-frame set of information.

By way of example, in the PDC, there is an UPCH that is a bi-directional, point-to-point channel that can be used to transfer user packet data. The uplinked UPCH is a random access type and is exemplary of a packet-switched data connection 150. The circuit-switched connection 160, on the other hand, is exemplified by at least the Traffic Channel (TCH). The TCH is a point-to-point, bi-directional channel used for transferring encoded speech and user data.

After the MS/DTE 130 establishes a connection with the wireless network 180, the MS/DTE 130 negotiates a computer communications protocol (e.g., a PPP) with a peer. The peer may be, for example, the PMSC 110 (in cases of PPP transmission/reception directly with the wireless network 180) or may be a component of a network access server (NAS) that is associated with an Internet Service Provider (ISP) through which the subscriber of the MS/DTE 130 achieves Internet access (in cases in which the wireless network 180 is a conduit for data communications).

Figure 2:
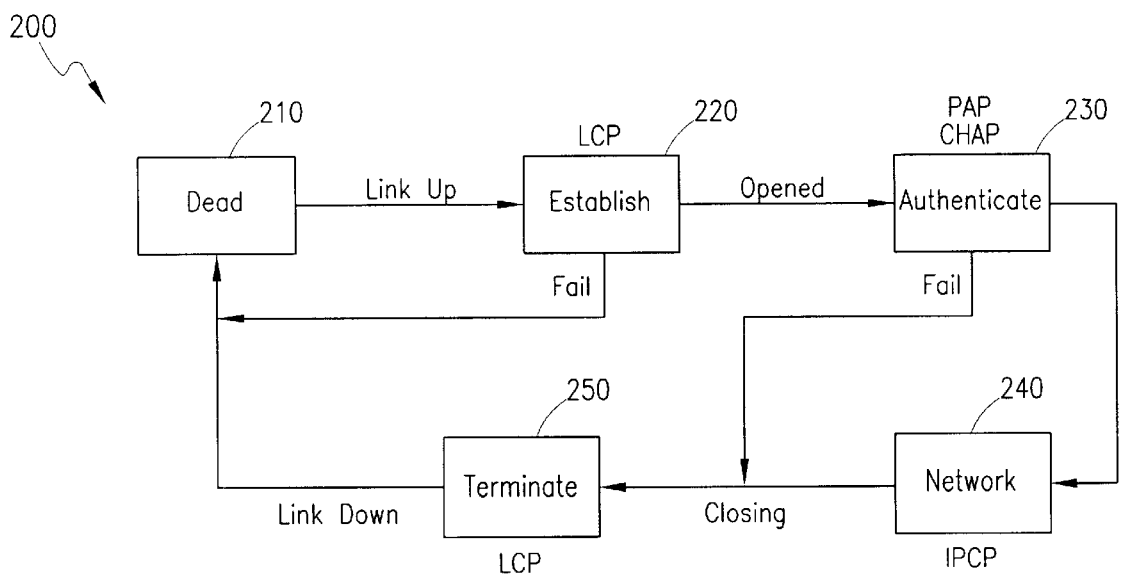
FIG. 2 illustrates a state diagram of various phases in a communication effectuated according to a PPP.

Referring now to FIG. 2, a state diagram of various phases in a communication effectuated according to a PPP is illustrated. The state diagram is shown generally at 200. It should be noted that numerous other computer communication protocols instead of a PPP may be used in conjunction with the present invention. PPP involves several sub-protocols that determine the parameters for the communication. The management of the serial link parameters between the MS/DTE 130 and the wireless network 180 is handled by the Link Control Protocol (LCP). The LCP is used to automatically configure link-related parameters (such as encapsulation format options) and to disconnect the link during the termination phase. Each end of the PPP link first sends LCP packets to configure and test the data link.

In state diagram 200, the link begins and ends with a dead phase 210. The LCP data packets are transmitted by each side of the link during the establish phase 220. Other configuration options can also be set in the establish phase 220. If a link is properly established, then an "Opened" transition leads to an authenticate phase 230. Authentication can consume several moments while the subscriber waits. It should be noted, however, that the authentication phase 230 is optional.

If authentication is successfully performed (or not performed at all), then the PPP procedure transitions to a network phase 240. In the network phase 240, various Network Control Protocols (NCPs) may be opened for communication under various protocols. One such NCP is the Internet Protocol Control Protocol (IPCP), which is used for setting-up and configuring additional parameters specially needed by the IP layer. If the set-up under the IPCP fails or when the IPCP session of the network phase 240 is concluded, a "Closing" transition occurs. The terminate phase 250 follows the "Closing" transition and/or the "Fail" transitions. The terminate phase 250 also operates through the LCP. The state diagram 200 subsequently returns to the dead phase 210 after the terminate phase 250.

Figure 3:
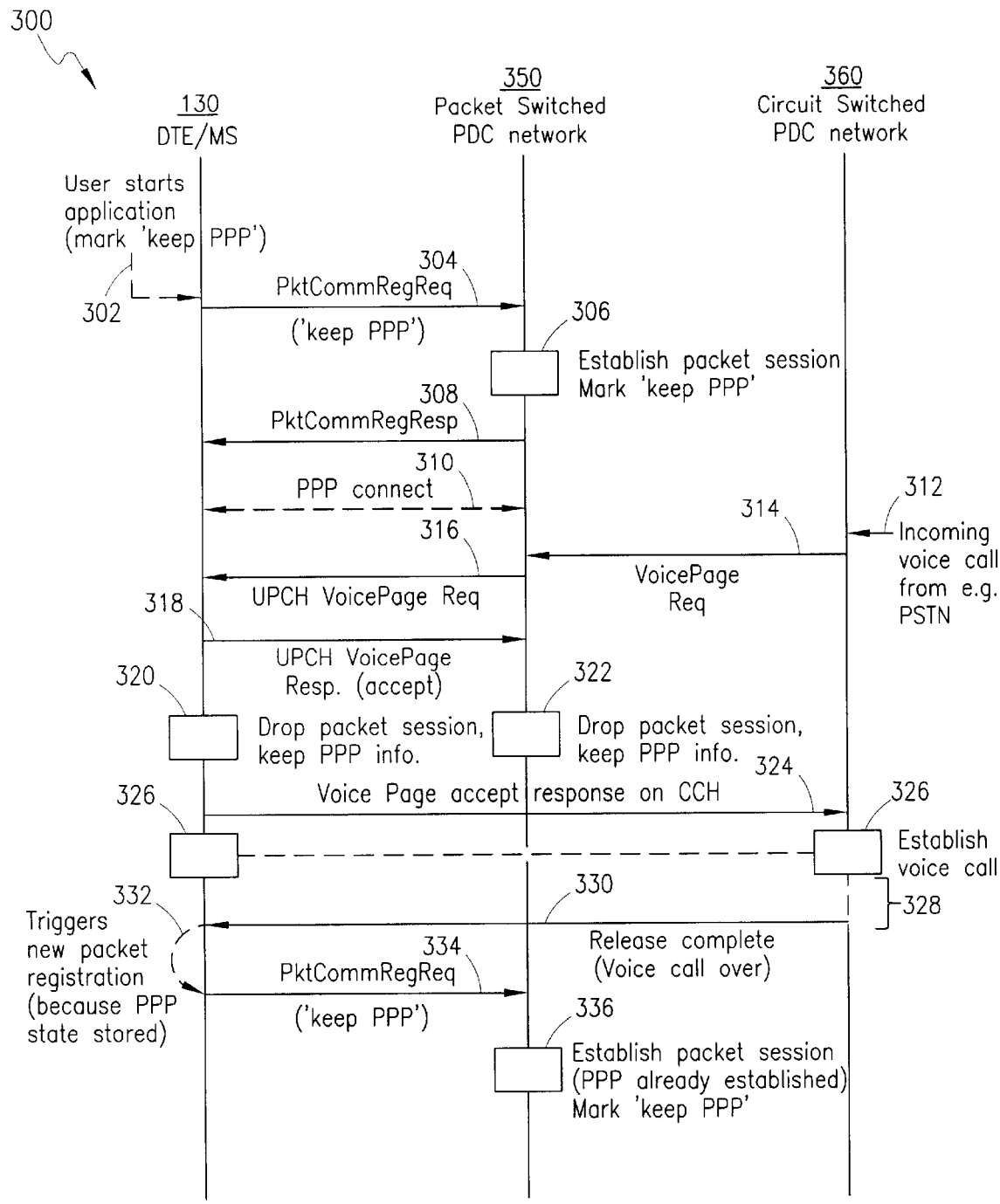
FIG. 3 illustrates a packet-switched data communication retaining and restoring sequence diagram in accordance with the present invention.

Referring now to FIG. 3, a packet-switched data communication retaining and restoring sequence diagram in accordance with the present invention is illustrated. The sequence diagram is designated generally by element number 300. The DTE/MS 130, a packet-switched PDC network portion 350, and a circuit-switched PDC network portion 360 are represented in the sequence diagram 300. The packet-switched PDC network portion 350 corresponds to the packet-switched data connection 150 (e.g., a communication via the UPCH of the PDC). The circuit-switched PDC network portion 360 corresponds to the circuit-switched connection 160 (e.g., a communication via the TCH of the PDC).

According to one aspect of a preferred embodiment of the present invention, a retain data communication call-waiting-type feature may be activated by the subscriber of the DTE/MS 130. The retain data communication call-waiting-type feature facilitates the continuance of a previously-negotiated computer communications protocol after an interruption This retain data communication call-waiting-type feature may be activated by the subscriber in one of two exemplary manners: either permanently or per-call. With the permanent activation technique, the retain data communication call-waiting-type feature, once activated, remains activated in the DTE/MS 130 of the subscriber for all subsequent packet-switched data connections until the subscriber deactivates the feature. With the per-call activation technique, the retain data communication call-waiting-type feature is activated by the subscriber for each single packet-switched data connection for which the feature is desired.

It should be understood, however, that under either the per-call or permanent activation technique, the DTE/MS 130 preferably requests during each initial establishment of the packet-switched data connection (e.g., for every packet session establishment) that the parameters of the computer communications protocol be retained. As a result, the present invention may be implemented without modification to the air interface of the PDC. For example, the retain computer communications protocol request may be passed to the wireless network 180 in a packet communication registration message as operator specific information. There need be no special application executed by the subscriber prior to the actual registration.

In the sequence diagram 300, the per-call activation technique is demonstrated. Initially, the subscriber elects to activate the retain data communication call-waiting-type feature (e.g., "mark 'keep PPP'") for the subsequent packet-switched data connection. Such a feature activation (and subsequent request) may originate at either the MS portion or the DTE portion of the DTE/MS 130. The subscriber subsequently starts (e.g., initiates) an application (302). A packet communication registration request ("PktCommRegReq") is transmitted by the DTE/MS 130 to the packet-switched PDC network portion 350 with a command to 'keep PPP' (304). As explained above, the designation for keeping the packet session information can be located at an operator-specific field of the packet communication registration request message in order to avoid affecting, for example, the PDC standard. At the packet-switched PDC network portion 350, a packet session is established with a notation to 'keep PPP' (306). A packet communication registration response ("PktCommRegResp") message is transmitted by the packet-switched PDC network portion 350 to the DTE/MS 130 (308).

A PPP connection is negotiated between the two peers, namely the DTE/MS 130 (e.g., preferably by the DTE portion) and the packet-switched PDC network portion 350 (e.g., preferably by the PMSC 110), (310) The PPP connection negotiation may take several seconds. At this point, the DTE/MS 130 has established a packet-switched data connection by, at least in part, negotiating a computer communications protocol (e.g., a PPP). The PPP connection is negotiated in the packet session, so packet data applications can now transmit user data (e.g., IP packets). The PPP connection may be automatically negotiated in response to the initiation of a packet data application if a PPP connection has not been negotiated prior to such application initiation. It should be noted that the negotiation of a PPP connection must occasionally be performed manually, which can be an added irritation factor. The present invention can advantageously eliminate this extra (possibly manual) process. Furthermore, obviating the need to reinitiate those packet data applications that do not time out during the incoming voice call saves considerable time.

Continuing now with FIG. 3, an incoming voice call is received at (or originated from elsewhere in) the wireless network 180 (specifically at the circuit-switched PDC network portion 360) for the subscriber of the DTE/MS 130 from a calling party (e.g., located in a PSTN or a PLMN) (312). A voice page request ("VoicePageReq") message is sent from the circuit-switched PDC network portion 360 to the packet-switched PDC network portion 350 (314). Via the packet-switched PDC network portion 350, the DTE/MS 130 receives a voice page request ("VoicePageReq") message over the UPCH (316). This voice page request is an aspect of the exemplary implementation of the call-waiting-type feature of the present invention in the PDC. In this example, the subscriber chooses to accept the incoming voice call, and the DTE/MS 130 transmits a voice page response ("VoicePageResp") message on the UPCH to the packet-switched PDC network portion 350 accepting the incoming voice call (318).

The DTE/MS 130 releases the packet session and keeps the negotiated parameters of the packet data communication (e.g., 'PPP information') (320). The parameters are stored by the DTE/MS 130, preferably in the DTE memory 135. It should be understood that the parameters may also be stored in the MS memory 140. Furthermore, as the functions, features, and packaging of the MS and the DTE portions of the DTE/MS 130 merge, the two memories may be merged as well.

The saved parameters preferably include at least part of the negotiated PPP information. One example of information that is negotiated for the PPP link and may be advantageously saved is the DCN (e.g., an IP address). In fact, under current standard PPP practices and under current typical dynamic DCN address allocation, the DCN must be saved in order to continue running applications without a new PPP negotiation. Other examples of negotiated PPP information that can be advantageously saved are the PPP state, whether VJ header compression is enabled, and header compression cache options.

The PPP termination point in the wireless network 180 (e.g., the PMSC 110) also saves the parameters of the packet-switched data connection (e.g., at the PMSC memory 120). In other words, the packet-switched PDC network portion 350 also releases the packet session and keeps the parameters of the packet data communication (e.g., 'PPP information') (322). The parameters stored by the packet-switched PDC network portion 350 are similar to those stored by the DTE/MS 130 as explained above.

The DTE/MS 130 subsequently transmits a voice page response ("VoicePageResp") message to the circuit-switched PDC network portion 360 accepting the incoming call (324). Prior to establishing the voice call, the packet session is released (e.g., Layer. 1 to Layer 3 of the air interface between the DTE/MS 130 and the packet-switched PDC network portion 350 is released). The voice call is then established between the circuit-switched PDC network portion 360 and the DTE/MS 130 in accordance with well-known procedures (326). Subsequently, the voice call is conducted, and the termination of the voice call is initiated by the DTE/MS 130 (328), both in accordance with known procedures. Finally, the circuit-switched PDC network portion 360 transmits to the DTE/MS 130 a release complete ("RelComp") message to signify that the voice call is over (330).

The reception of the RelComp message by the DTE/MS 130 triggers a new packet data registration because the computer communication protocol data connection parameters are stored within the DTE memory 135 (and a flag is optionally set in the MS memory 140) (332). The DTE/MS 130 transmits a packet communication registration request ("PktCommRegReq") message to the packet-switched PDC network portion 350 with the command to 'keep PPP' (334). The packet-switched PDC network portion 350 may then reestablish the previous packet data session by retrieving the parameters of the computer communication protocol data communication saved within the PMSC memory 120 (336). Hence, the packet data session communication may continue without renegotiating the PPP. The packet-switched PDC network portion 350 also notes that the packet data communication is continued under a 'keep PPP' procedure.

Advantageously, negotiating a computer communications protocol (as exemplified above with reference to FIG. 2) anew after an interrupting voice call is unnecessary when applying the principles of the present invention. Moreover, the DTE/MS 130 will not need to restart packet data applications that were executing prior to an acceptance of the interrupting voice call. Examples of packet data applications that may be executing before an interruption and that may then be continued (unless timed-out) thereafter are: (a) dispatcher-type applications (e.g., transport services, taxi fleets, etc.) where information originates on the network side, (b) e-mail notifications, (c) push-type information (e.g., sports scores, traffic reports, stock data updates), and (d) the transmission of paging data over a PLMN.

Subscriber packet data applications may therefore proceed without either the reinitiation of the applications themselves or the renegotiation of the PPP connection. Eliminating PPP renegotiation for situations that require that the PPP connection be negotiated manually is particularly beneficial. It should be noted that operators may be able to charge for this feature because several value-added services are provided to the subscriber. Most notably, significant time is saved when continuing packet applications after an interrupting call. Moreover, many subscribers receive dynamic IP address allocation for their DTE/MS 130. Because an IP address pool is a valuable network resource, charges may be levied for reserving an IP address during the interrupting call.

Figure 4:
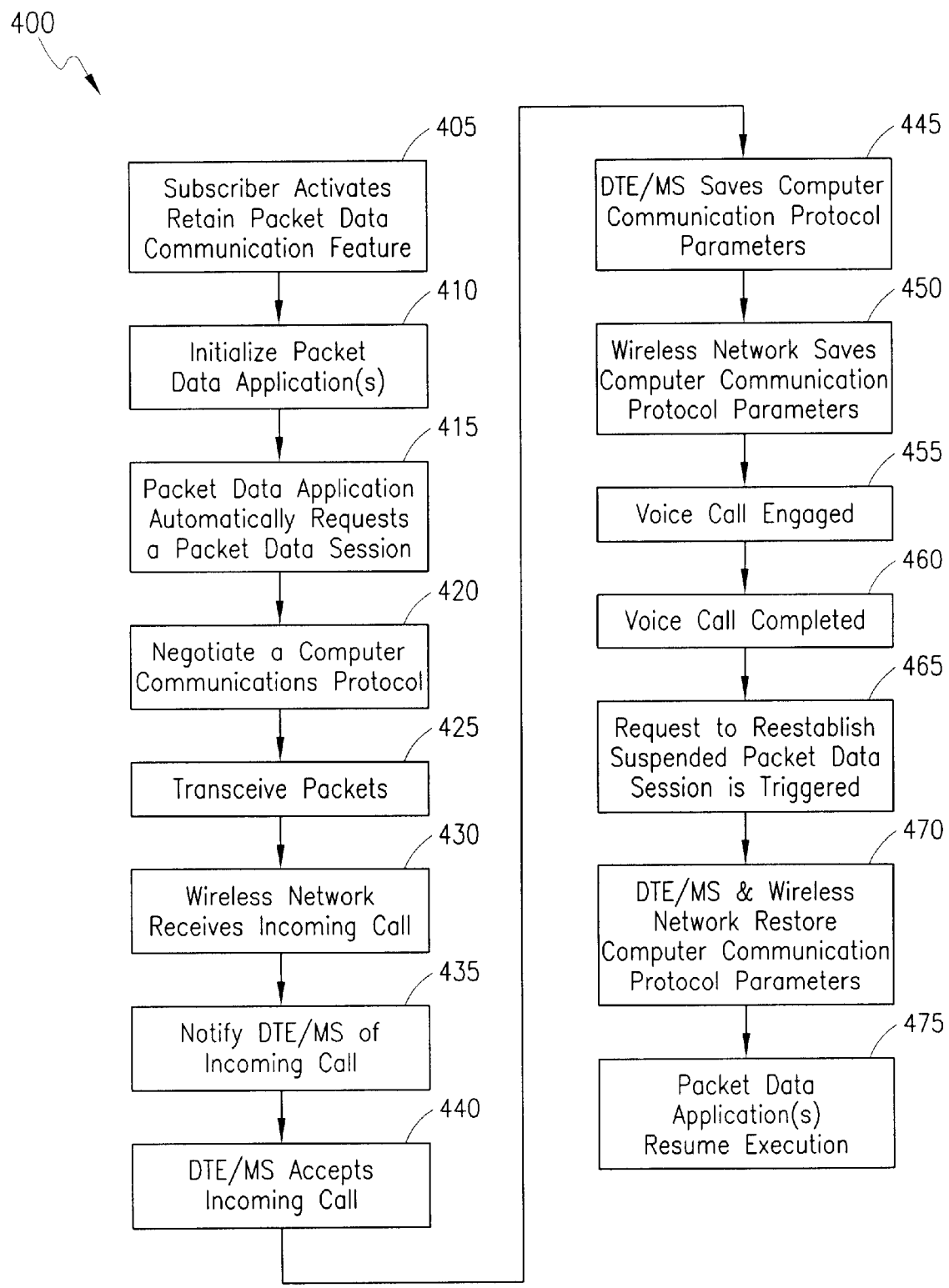
FIG. 4 illustrates a method in flowchart form for retaining and restoring a packet-switched data communication in accordance with the present invention.

Referring now to FIG. 4, a method in flowchart form for retaining and restoring a packet-switched data communication in accordance with the present invention is illustrated. The flowchart is designated generally by the element number 400. In the flowchart 400, the permanent activation technique is demonstrated. Initially, the subscriber activates the retain packet data communication call-waiting-type feature on a permanent basis via the DTE/MS (step 405). The DTE/MS records the activation command and thereafter (until deactivation by the subscriber) includes a packet communication retention request in messages establishing a packet data session.

At some subsequent time, the DTE/MS (possibly at the command of the subscriber) initializes one or more packet data applications (step 410). In this example, at least one of the packet data applications automatically requests the establishment of a packet data session (step 415). Because the permanent activation technique is engaged, the request includes a command to retain the computer communication protocol parameters. The DTE/MS next negotiates a computer communications protocol (e.g., a PPP between the PMSC and the DTE/MS as described above with reference to FIG. 2) (step 420). The DTE/MS may now transmit and receive packets of data via the established packet data communication (step 425).

Eventually, during the current packet data communication, the wireless network system may receive an incoming call (which may be voice, fax data, etc.) (step 430). The wireless network system will then notify the DTE/MS of the incoming call, which will be considered a voice call in this example (step 435). The DTE/MS may choose to accept the incoming voice call (step 440). To enable retention and fast reestablishment of the packet data communication, the DTE/MS saves (e.g., stores in memory) the computer communications protocol parameters (step 445). The wireless network system (e.g., a PMSC) also saves the computer communications protocol parameters (step 450).

The incoming voice call may then be engaged by the DTE/MS and the wireless network system (step 455). After the incoming voice call is terminated, the wireless network system signals to the DTE/MS that the voice call is completed (step 460). This call completion signal triggers a request by the DTE/MS to reestablish the suspended packet data session (step 465). Consequently, the DTE/MS and the wireless network system restore the saved computer communications protocol parameters (step 470). The packet data applications that were previously initiated on the DTE/MS may resume/continue executing if they have not otherwise timed-out (step 475).

Advantageously, the flowchart 400 does not require steps for renegotiating a computer communication protocol or for reinitializing packet data applications. The subscriber is thus able to quickly resume/continue packet data transmission and reception after termination of an interrupting incoming call. Not only is the restoration of the pre-existing packet data communication quick, but it is also a much more certain procedure than attempting to establish a new packet data communication.

It should be explained that in an alternative embodiment in which the information packets are to be routed to an NAS and then to the Internet, the wireless network system may be configured so as to maintain the PPP relay between the PMSC and the NAS while the DTE/MS receives the incoming call. Thus, the PPP path between the DTE/MS and the Internet may be quickly restored after completion of the incoming voice call.

Although a preferred embodiment of the method and system of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for restoring an interrupted packet communication in a wireless communications system, comprising the steps of:
   receiving notification of an incoming call;
   suspending at least a portion of a packet communication at a point of suspension;
   storing information that pertains to said packet communication between a mobile terminal and a wireless network, said information comprising computer communications point-to-point (PPP) protocol, said information being stored by said mobile terminal;
   receiving said incoming call at said mobile terminal; and
   restoring, from said point of suspension, said packet communication between said mobile terminal and said wireless network based, at least in part, on said information that pertains to said packet communication between said mobile terminal and said wireless network, said restoring performed without renegotiation of said computer communications point-to-point protocol.

2. The method of claim 1, wherein said step of suspending at least a portion of said packet communication further comprises the step of ceasing transceiving via said packet communication.

3. The method of claim 1, wherein said packet communication further comprises a link between said mobile terminal and a packet mobile services switching center of said wireless network.

4. The method of claim 1, wherein said information further comprises at least one parameter negotiated according to a computer communications protocol.

5. The method of claim 4, wherein said at least one parameter comprises a data communication number.

6. The method of claim 1, further comprising the step of:
   establishing said packet communication between said mobile terminal and said wireless network.

7. The method of claim 6, wherein said step of establishing said packet communication between said mobile terminal and said wireless network further comprises the step of negotiating, between said mobile terminal and said wireless network, a computer communications protocol.

8. The method of claim 7, further comprising the step of:
   reserving, by said wireless network and for said mobile terminal, a dynamically-allocated Internet Protocol address.

9. The method of claim 8, further comprising the step of:
   activating a packet communication retention feature prior to said step of establishing said packet communication between said mobile terminal and said wireless network.

10. The method of claim 9, wherein said step of activating a packet communication retention feature further comprises the step of activating on a permanent basis said packet communication retention feature in said mobile terminal.

11. The method of claim 1, wherein said incoming call comprises an incoming circuit call.

12. The method of claim 1, further comprising the steps of:
   initiating at least one packet application at said mobile terminal prior to said step of storing information that pertains to said packet communication between said mobile terminal and said wireless network; and
   continuing said at least one packet application after said step of restoring said packet communication between said mobile terminal and said wireless network without either reinitiating said at least one packet application or renegotiating a computer communications protocol.

13. In a wireless communications system, a mobile terminal for restoring an interrupted packet communication, said mobile terminal comprising:

a memory;

packet communication establishing circuitry, said packet communication establishing circuitry capable of establishing a packet communication between said mobile terminal and a wireless network;

paging circuitry, said paging circuitry adapted to process an incoming call paging signal from said wireless network;

parameter storing circuitry, said parameter storing circuitry adapted to store at least a point-to-point protocol parameter of said packet communication in said memory;

packet communication suspending circuitry, said packet communication suspending circuitry engaging, at a point of suspension, said parameter storing circuitry in response to said paging circuitry; and packet communication restoring circuitry, said packet communication restoring circuitry capable of restoring, from said point of suspension, said packet communication between said mobile terminal and said wireless network based, at least in part, on said at least one parameter of said packet communication, said restoring performed without renegotiation of said point-to-point protocol of said packet communication.

14. The mobile terminal of claim 13, wherein said packet communication suspending circuitry ceases transceiving via said packet communication in response to said paging circuitry.

15. The mobile terminal of claim 13, wherein said packet communication establishing circuitry further comprises link negotiation circuitry that negotiates a link according to a computer communications protocol.

16. The mobile terminal of claim 13, wherein said at least one parameter of said packet communication comprises an Internet Protocol address.

17. The mobile terminal of claim 13, further comprising:

activation circuitry, said activation circuitry configured so as to activate a packet communication restoration feature by transmitting at least one signal to said wireless network.

18. The mobile terminal of claim 13, wherein said packet communication suspending circuitry engages said parameter storing circuitry in response to said paging circuitry when said paging circuitry processes an incoming call paging signal for an incoming circuit call.

19. In a wireless communications system, a wireless network for restoring an interrupted packet communication, said wireless network comprising:

a memory;

packet communication establishing circuitry, said packet communication establishing circuitry capable of establishing a packet communication between a mobile terminal and said wireless network;

parameter storing circuitry in said mobile terminal, said parameter storing circuitry adapted to store at least point-to-point protocol parameters of said packet communication in said memory;

packet communication suspending circuitry, said packet communication suspending circuitry engaging, at a point of suspension, said parameter storing circuitry in response to a paging acceptance signal from said mobile terminal; and packet communication restoring circuitry, said packet communication restoring circuitry capable of restoring, at said point of suspension, said packet communication between said mobile terminal and said wireless network based, at least in part, on said at least one parameter of said packet communication, said restoring performed without renegotiation of said point-to-point protocol of said packet communication.

20. The wireless network of claim 19, wherein said packet communication suspending circuitry ceases transceiving on said packet communication in response to said paging acceptance signal from said mobile terminal.

21. The wireless network of claim 19, wherein said packet communication establishing circuitry further comprises link negotiation circuitry that negotiates a link according to a computer communications protocol.

22. The wireless network of claim 19, wherein said at least one parameter of said packet communication comprises a data communication number.

23. The wireless network of claim 19, further comprising:

activation circuitry that is configured to activate a packet communication restoration feature after receiving at least one activation signal from said mobile terminal.

24. The wireless network of claim 19, wherein said packet communication suspending circuitry reserves an Internet Protocol address for said mobile terminal.

\* \* \* \* \*

UNITED STATES PATENT AND TRADEMARK OFFICE
CERTIFICATE OF CORRECTION

PATENT NO. : 6,560,239 B1
DATED : May 6, 2003
INVENTOR(S) : Lars Anders Frid et al.

It is certified that error appears in the above-identified patent and that said Letters Patent is hereby corrected as shown below:

<u>Title page,</u>
Item [75], Inventors, replace "Martin Backstrom, Huddinge (SE)" with
-- Martin Backstrom, Danderyd (SE) --
Item [56], OTHER PUBLICATIONS, replace "Mar. 19, 1999, EPO." with
-- Mar. 17, 1999, EPO. --

<u>Column 7,</u>
Line 2, replace "(310)" with -- (310). --

Signed and Sealed this

Twentieth Day of January, 2004

JON W. DUDAS
*Acting Director of the United States Patent and Trademark Office*